United States Patent [19]
Gandel et al.

[11] Patent Number: 6,167,568
[45] Date of Patent: Dec. 26, 2000

[54] METHOD AND APPARATUS FOR IMPLEMENTING ELECTRONIC SOFTWARE DISTRIBUTION

[75] Inventors: Deborah E. Gandel, San Carlos; Katherine V. G. Dickinson, Palo Alto; Christine A. Miller, Scotts Valley; Daniel P. Gilliland, San Ramon; Jasmine Ocegueda; Jay D. Hastings, both of San Jose, all of Calif.; Karin Ellison, Seal Rock, Oreg.; Shelley F. Pavela, Foster City, Calif.; Kenneth J. Poje, San Jose, Calif.; Gary E. Linnert, Redwood City, Calif.; John L. Barker, Palo Alto, Calif.

[73] Assignee: Sun Microsystems, Inc., Palo Alto, Calif.

[21] Appl. No.: 09/107,245

[22] Filed: Jun. 30, 1998

[51] Int. Cl.$^7$ ................................................ G06F 9/445
[52] U.S. Cl. ........................... 717/11; 705/26; 707/9; 707/10; 709/217; 717/1
[58] Field of Search .................... 705/26; 713/1, 713/200; 709/217, 220, 221, 225, 222; 714/11, 1; 707/9, 10, 200, 203

[56] References Cited

U.S. PATENT DOCUMENTS

| | | | |
|---|---|---|---|
| 5,802,286 | 9/1998 | Dere et al. ............................... | 709/220 |
| 5,805,891 | 9/1998 | Bizuneh et al. ........................ | 395/704 |
| 5,907,705 | 5/1999 | Carter ..................................... | 395/701 |
| 5,953,533 | 9/1999 | Fink et al. .............................. | 395/712 |
| 5,956,709 | 9/1999 | Xue ........................................ | 707/3 |
| 5,970,472 | 10/1999 | Allsop et al. ........................... | 705/26 |
| 5,978,578 | 11/1999 | Azarya et al. .......................... | 395/701 |
| 5,991,543 | 11/1999 | Amberg et al. ......................... | 395/712 |

OTHER PUBLICATIONS

David Clark, "Cisco Connect Online: It's Good for Business," IEEE Internet Computing, vol. 1, Issue 6, pp. 55–58, Nov.–Dec. 1997.

Kalaoja et al, "Feature Modelling of Component–Based Embedded Software," Proceedings of Eighth IEEE International Workshu on Software Technology and Engineering Practice, pp. 444–451, Jul. 1997.

Jones et al, "The ESA Software Engineering Standards: Past, Present and Feature," Emerging International Standards, Third IEEE 1997, ISESS 97, pp. 119–126.

Fedchark et al, "An Engineering Approach to Electronic Publishing," Proceedings of International Workshop on Multimedia Software Development, 1996, pp. 80–88, Mar. 25–26, 1996.

Rozman et al, "United View on ISO 9001 Model and SEI CMM," Proceedings of the 1994 IEEE International Engineering Management Conference, pp. 56–63, Oct. 17–19, 1994.

Beach et al, "An Integrated Manufacturing Data Management System," Proceedings of Competitive Manufacturing for Next Decade, IEMT Symposium, Nith IEEE/CHMT Int'l, pp. 306–311, Oct. 1–3, 1990.

"Software Distribution by CD–ROM Linked with Network," IBM Technical Disclosure Bulletin, vol. 38, No. 11, pp. 111–112, Nov. 1995.

*Primary Examiner*—Kakali Chaki
*Assistant Examiner*—Tuan Q. Dam
*Attorney, Agent, or Firm*—Squire, Sanders & Dempsey L.L.P.

[57] ABSTRACT

An embodiment consistent with the present invention includes a method and apparatus for performing software distribution of a software product electronically. Readiness criteria information associated with the software product is received via software in a data processing system. The readiness criteria information is posted in a central location. A private environment is then provided within the data processing system for accommodating an online site. The online site, which contains links to the software product in accordance with the readiness criteria information, is installed into the private environment. The online site is tested in the private environment in accordance with the UAT criteria information. When the online site meets the readiness and UAT criteria, a public environment is provided with access to the online site.

17 Claims, 12 Drawing Sheets

FIG. 1  ELECTRONIC SOFTWARE DISTRIBUTION APPARATUS

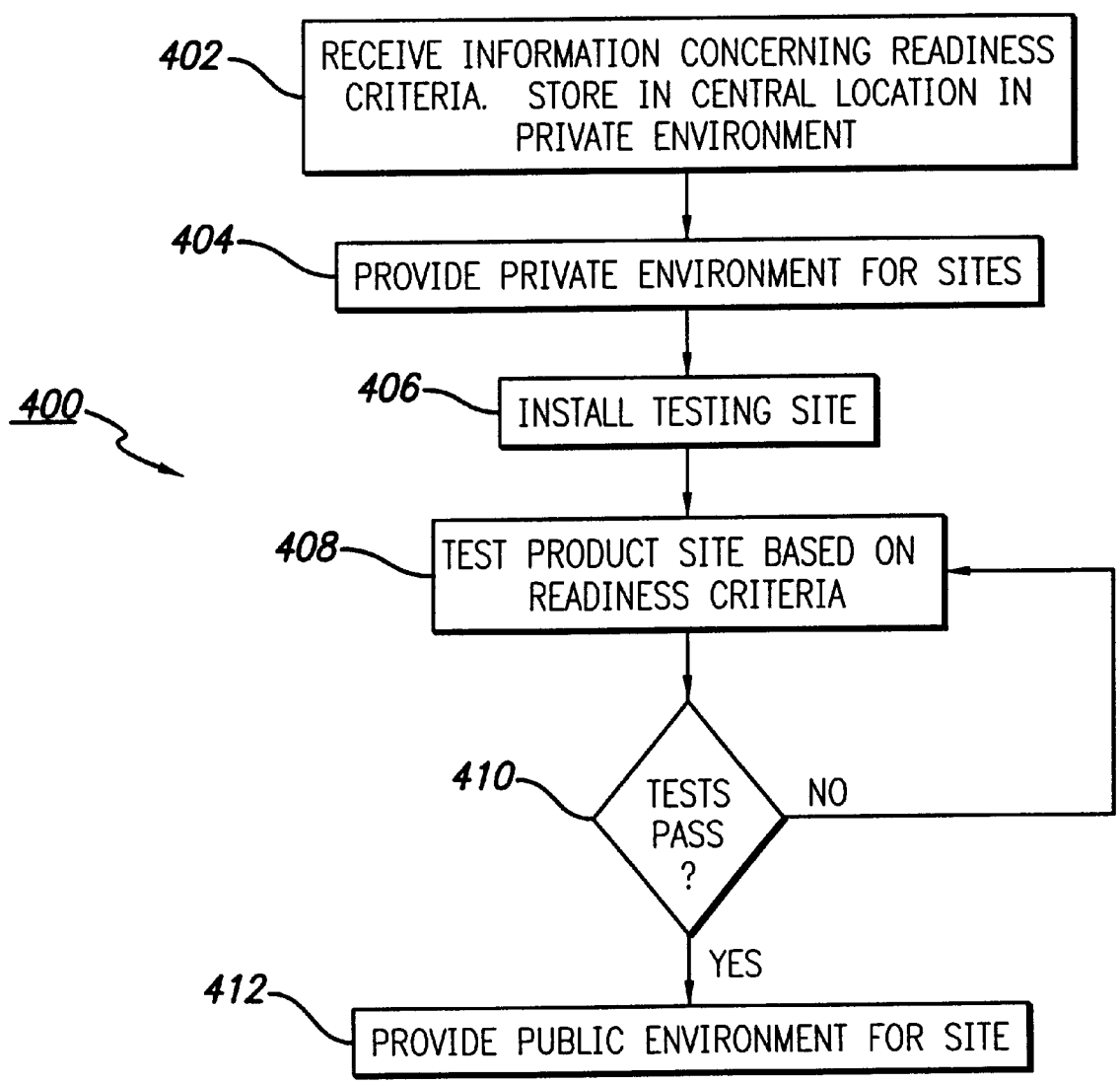

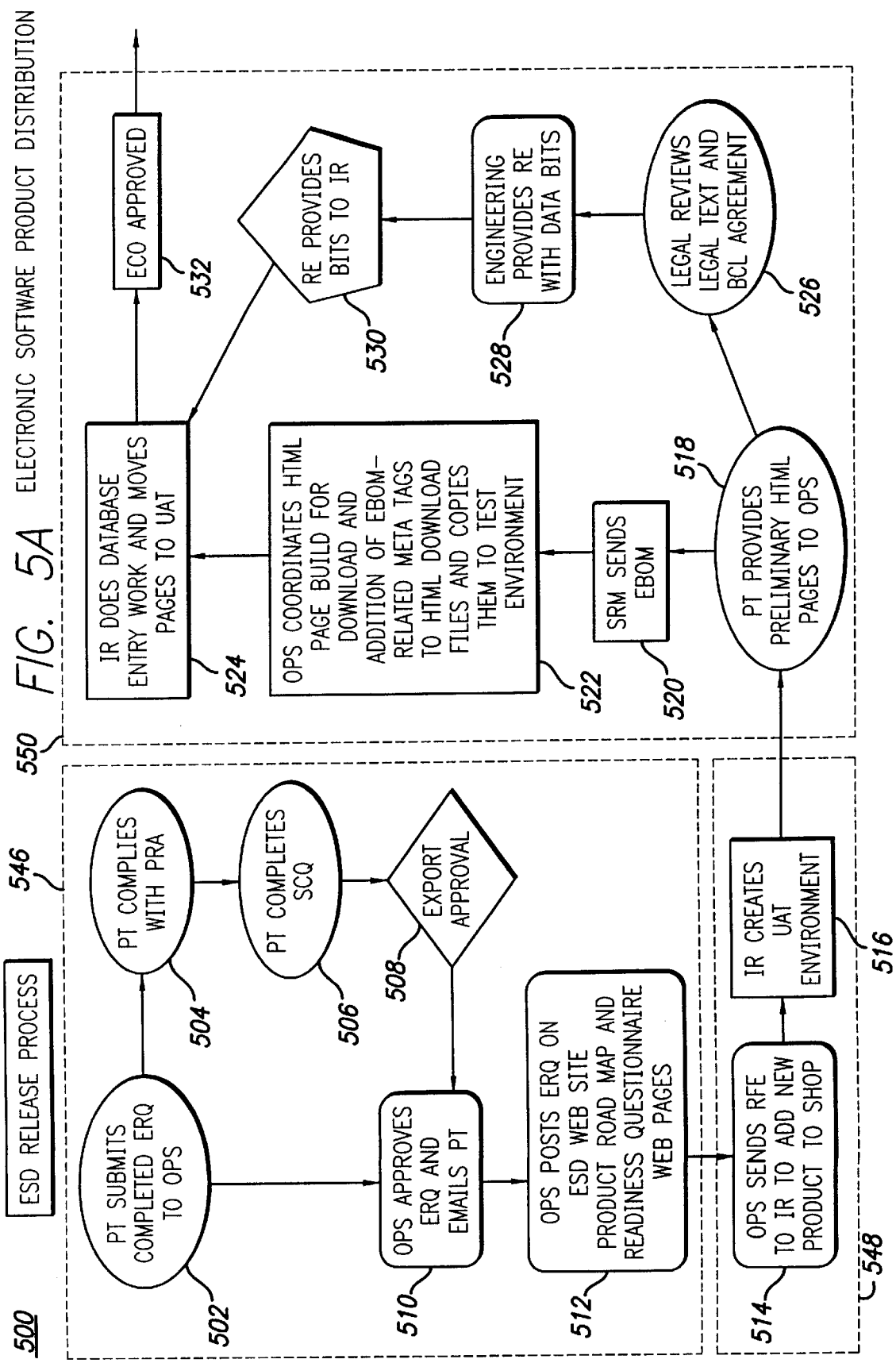

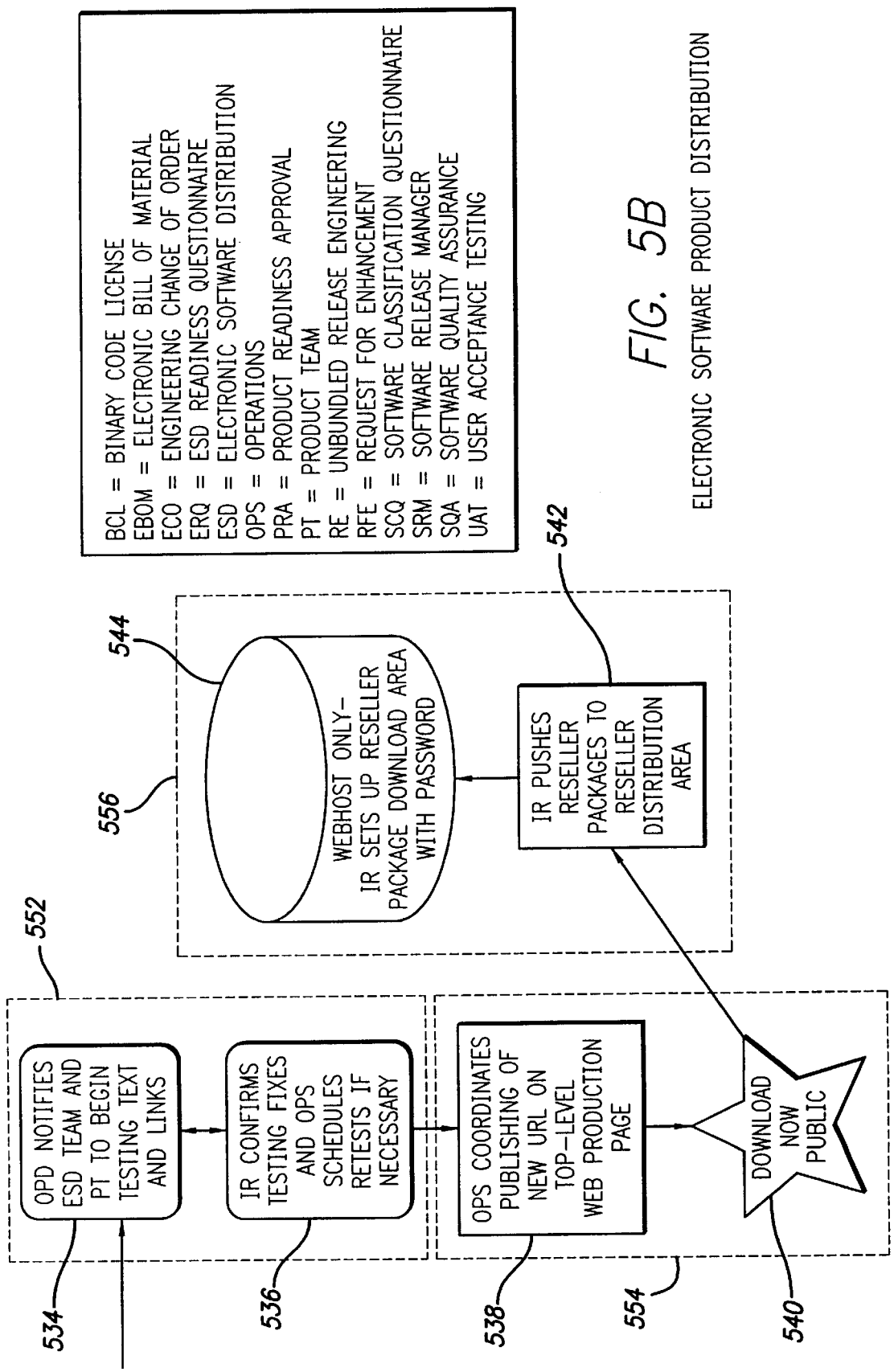
FIG. 5B  ELECTRONIC SOFTWARE PRODUCT DISTRIBUTION

SUBMISSION OF COMPLETED ERQ TO OPERATIONS

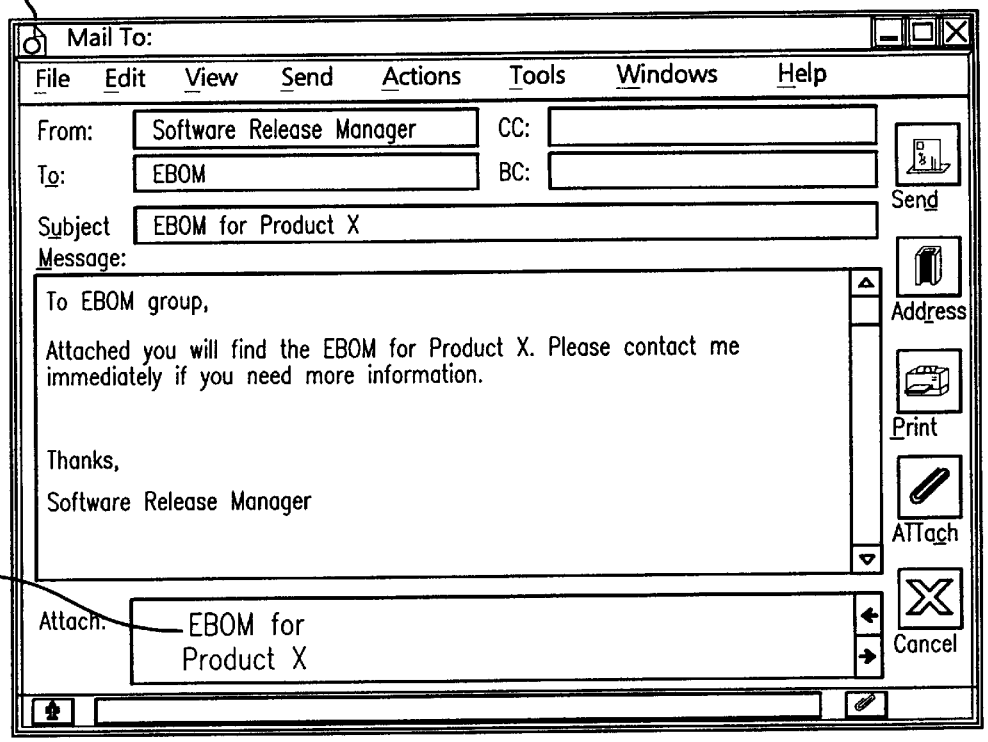
FIG. 11 SENDING ELECTRONIC BILL OF MATERIALS (EBOM)
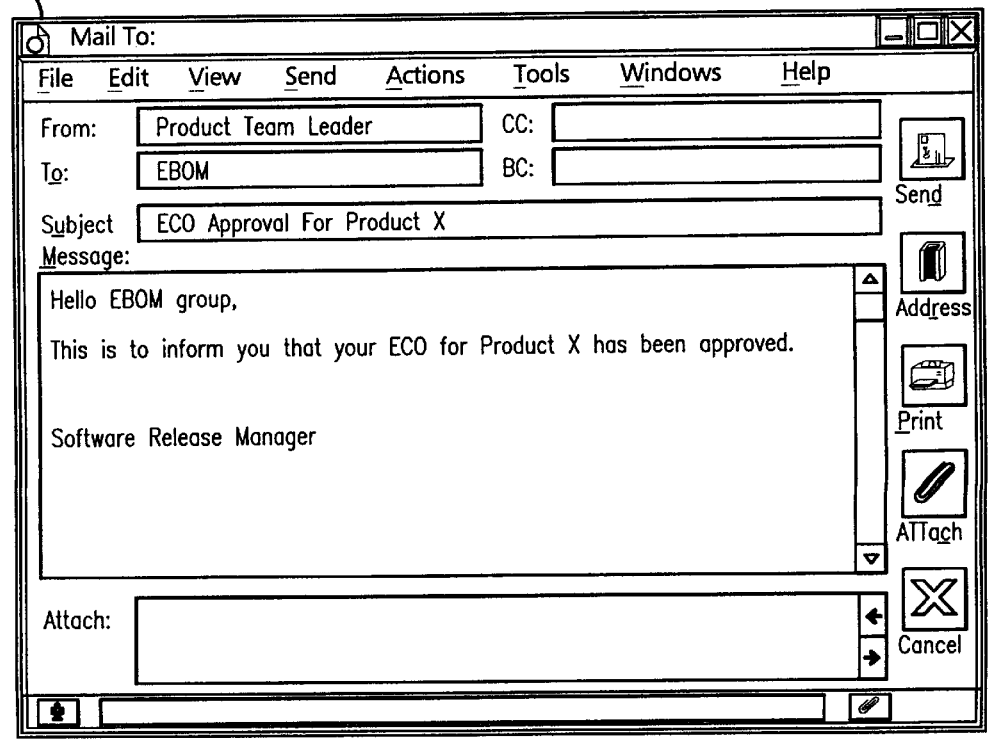
FIG. 12 ENGINEERING CHANGE ORDER APPROVAL (ECO)

NOTIFICATION TO BEGIN TESTING

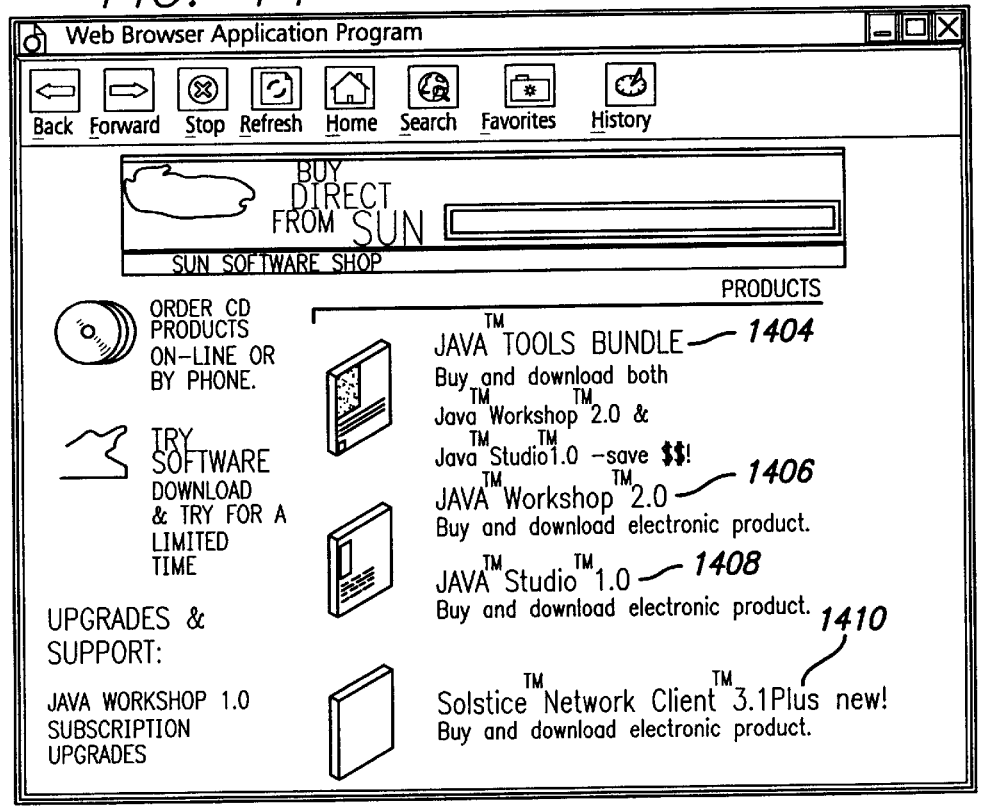

FIG. 14

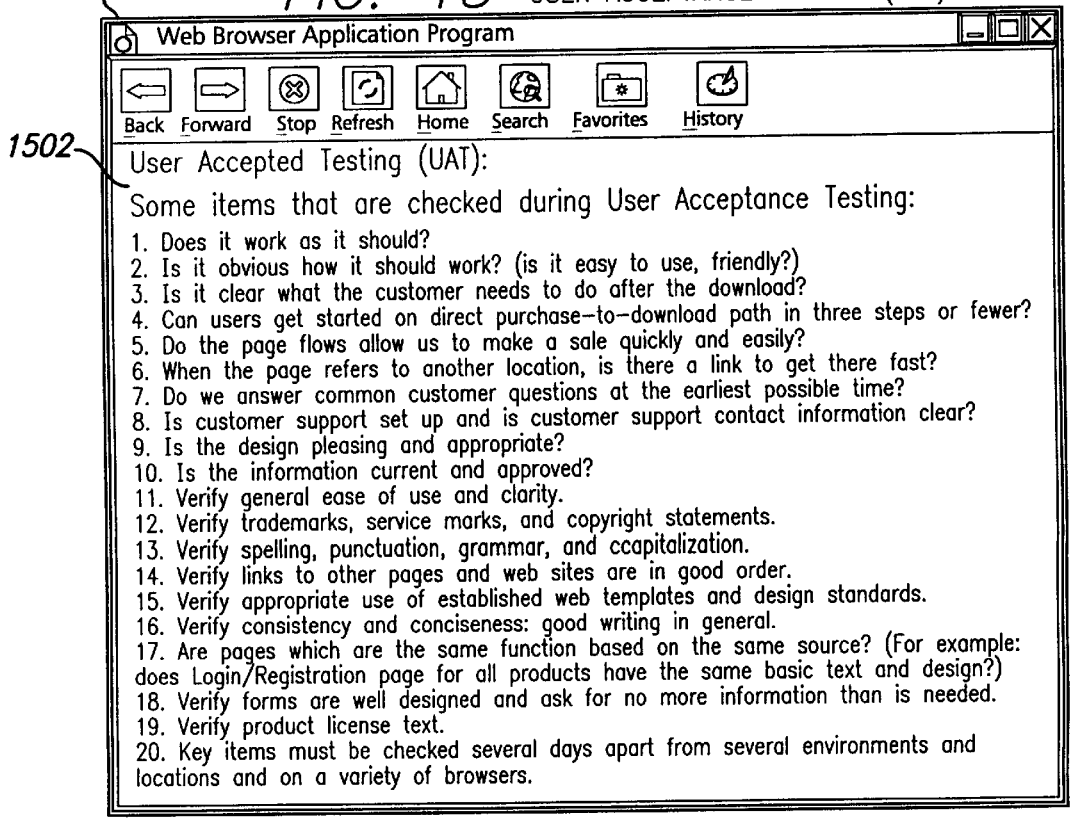

FIG. 15  USER ACCEPTANCE TESTING (UAT)

User Accepted Testing (UAT):
Some items that are checked during User Acceptance Testing:
1. Does it work as it should?
2. Is it obvious how it should work? (is it easy to use, friendly?)
3. Is it clear what the customer needs to do after the download?
4. Can users get started on direct purchase-to-download path in three steps or fewer?
5. Do the page flows allow us to make a sale quickly and easily?
6. When the page refers to another location, is there a link to get there fast?
7. Do we answer common customer questions at the earliest possible time?
8. Is customer support set up and is customer support contact information clear?
9. Is the design pleasing and appropriate?
10. Is the information current and approved?
11. Verify general ease of use and clarity.
12. Verify trademarks, service marks, and copyright statements.
13. Verify spelling, punctuation, grammar, and ccapitalization.
14. Verify links to other pages and web sites are in good order.
15. Verify appropriate use of established web templates and design standards.
16. Verify consistency and conciseness: good writing in general.
17. Are pages which are the same function based on the same source? (For example: does Login/Registration page for all products have the same basic text and design?)
18. Verify forms are well designed and ask for no more information than is needed.
19. Verify product license text.
20. Key items must be checked several days apart from several environments and locations and on a variety of browsers.

METHOD AND APPARATUS FOR IMPLEMENTING ELECTRONIC SOFTWARE DISTRIBUTION

FIELD OF THE INVENTION

The present invention relates generally to distribution of software products. More specifically, the invention is a method and apparatus for distributing software electronically.

BACKGROUND OF THE INVENTION

The process of distributing software is complicated and expensive. Numerous groups make up a software product distribution team, including software development, program management, quality assurance, and manufacturing. Each group must coordinate with each other in order to release a final product. Typically, there are multiple phases of the project, where each phase involves wider distribution of the product. These phases may include alpha and beta phases, that have the purpose of allowing software development and quality assurance to work out existing problems with the product, and a shipping phase, where the product is widely distributed and sold. For each phase, the software typically is distributed on a floppy disk or CD-ROM to prospective users of the software product. Preparing these disks for distribution is costly in terms of both labor and manufacturing.

The manufacturing cost includes the cost of purchasing writeable media such as the floppy disks or CD-ROMs, equipment to write the software files onto the media, labels to mark the media with the name and version of the software, and the packaging and shipping costs associated with sending the media to users and purchasers of the product. Labor costs include the cost of coordinating the manufacturing process, the testing process, and the physical distribution process. The manufacturing process includes the preparation of physical media for distribution, and may be very time-consuming depending on the availability of manufacturing resources. Additional costs may arise from mistakes in the process that require the re-manufacturing of the product media. For example, if a severe problem is detected late in the process after the media has been prepared, a product team may decide not to ship that set of media and opt to fix the problem and create a new set of media for distribution. Creating a new set of media for distribution is non-trivial and costs money in time, labor, and manufacturing, especially if resource bottlenecks occur at the manufacturing end of the process. Most importantly however, creating a new set of physical software distribution media delays the product's time to market.

Process standards such as ISO 9001 have been developed in an attempt to streamline product release processes, but problems remain, including reducing the cost of preparing media for distribution, and reducing the amount of time required to create the media and distribute it to the end user as quickly as possible.

SUMMARY OF THE INVENTION

To overcome the disadvantages of existing distribution systems, and consistent with the present invention, a method and apparatus for electronic software distribution is disclosed which makes electronic software distribution and e-commerce a viable channel for distributing and selling software products over the Internet on web locations. An electronic software distribution method consistent with the present invention has received ISO 9001 certification and has been used successfully in over 45 releases with over 100,000 downloads and $1 million in savings compared to prior art physical software distribution methods. This method addresses the technical problem of defining the criteria that must be met and completed in order to distribute and sell software products over the Internet in a secure, reliable, and competitive fashion.

In accordance with an embodiment consistent with the present invention, a method and apparatus for performing software distribution of a software product electronically includes the steps of collecting readiness criteria information associated with the software product, posting the readiness criteria information in a central location, providing a private online site, the online site containing links to the software product in accordance with the readiness criteria information, testing the online site in the private environment in accordance with the readiness criteria information, and providing a public environment with access to the online site when the online site meets the readiness criteria. An embodiment consistent with the present invention may be implemented as a computer program product or as a computer data signal embodied in a carrier wave.

Advantages of the invention will be set forth, in part, in the description that follows and in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 4 is a flow chart showing steps performed by a data processing system programmed to perform electronic software distribution in accordance with an embodiment consistent with the present invention.

FIG. 5 is a flow chart showing exemplary steps performed by a data processing system programmed to perform electronic software distribution in accordance with an embodiment consistent with the present invention.

FIG. 11 is a diagram showing an exemplary sending of an electronic bill of materials (EBOM) via software in a data processing system in accordance with an embodiment consistent with the present invention.

FIG. 12 is a diagram showing an exemplary approval of an engineering change order (ECO) via software in a data processing system in accordance with an embodiment consistent with the present invention.

FIG. 14 is a diagram showing an exemplary public environment for electronic software distribution via software in a data processing system in accordance with an embodiment consistent with the present invention.

FIG. 15 is a diagram showing an exemplary posting of items that are checked during User Acceptance Testing (UAT) via software in a data processing system in accordance with an embodiment consistent with the present invention.

DETAILED DESCRIPTION OF PREFERRED EMBODIMENTS

Reference will now be made in detail to embodiments consistent with the present invention, examples of which are illustrated in the accompanying drawings. Wherever possible, the same reference numbers will be used throughout the drawings to refer to the same or like parts.

Figure 1:
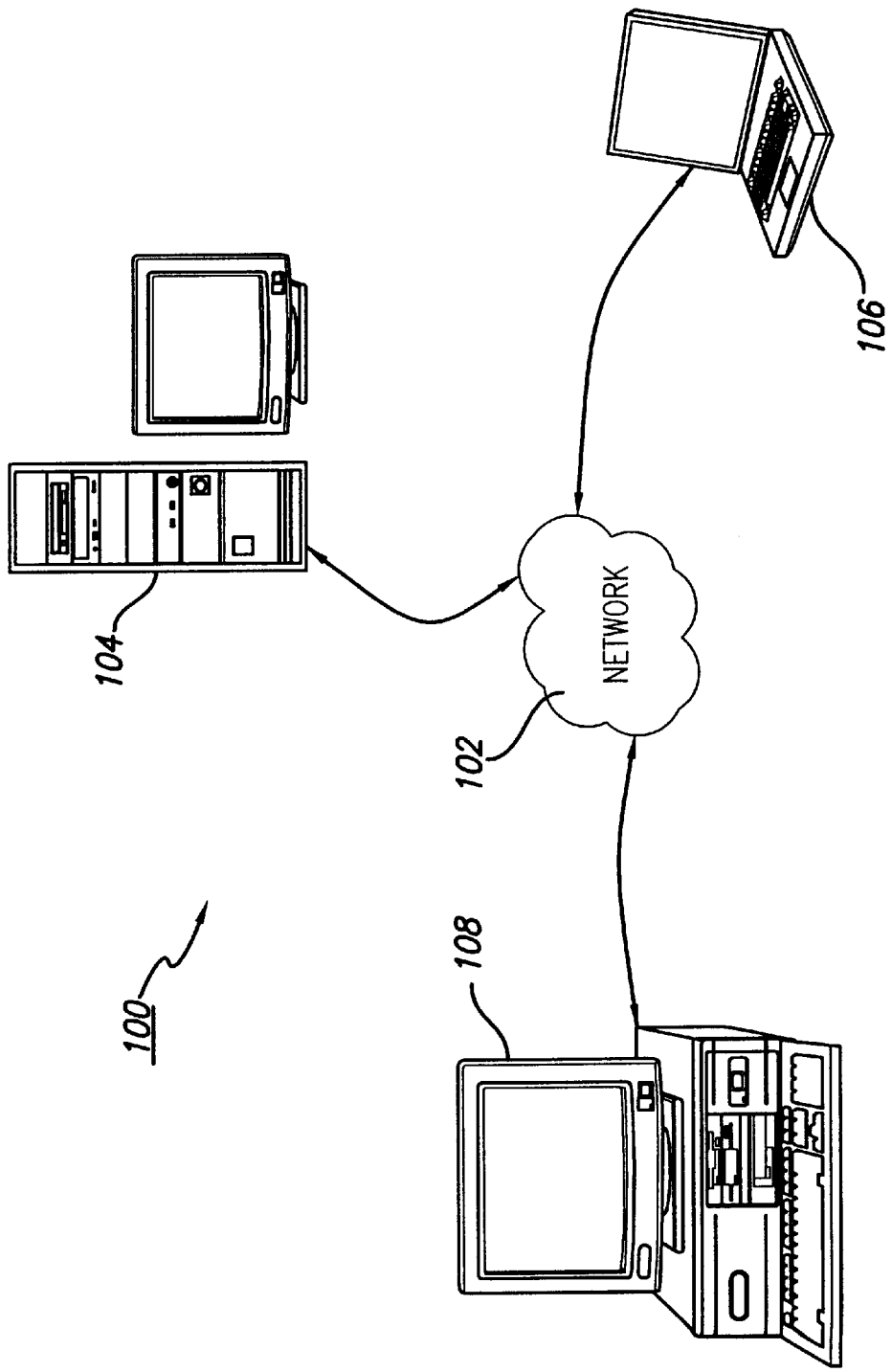
FIG. 1 is a diagram of a data processing system in accordance with an embodiment consistent with the present invention.

FIG. 1 shows an electronic software distribution apparatus 100 in accordance with an embodiment consistent with the present invention. Electronic software distribution apparatus 100 includes a network 102 through which data processing systems such as server system 104 and user systems 106, 108 may communicate with each other electronically via the network 102. User systems 106, 108 may be, for example, a laptop computer 106, a workstation 108, or any system that may used for electronic communication over a network 102. Electronic software distribution apparatus 100 may include one or more servers 104 and one or more user systems 106, 108.

Figure 2:
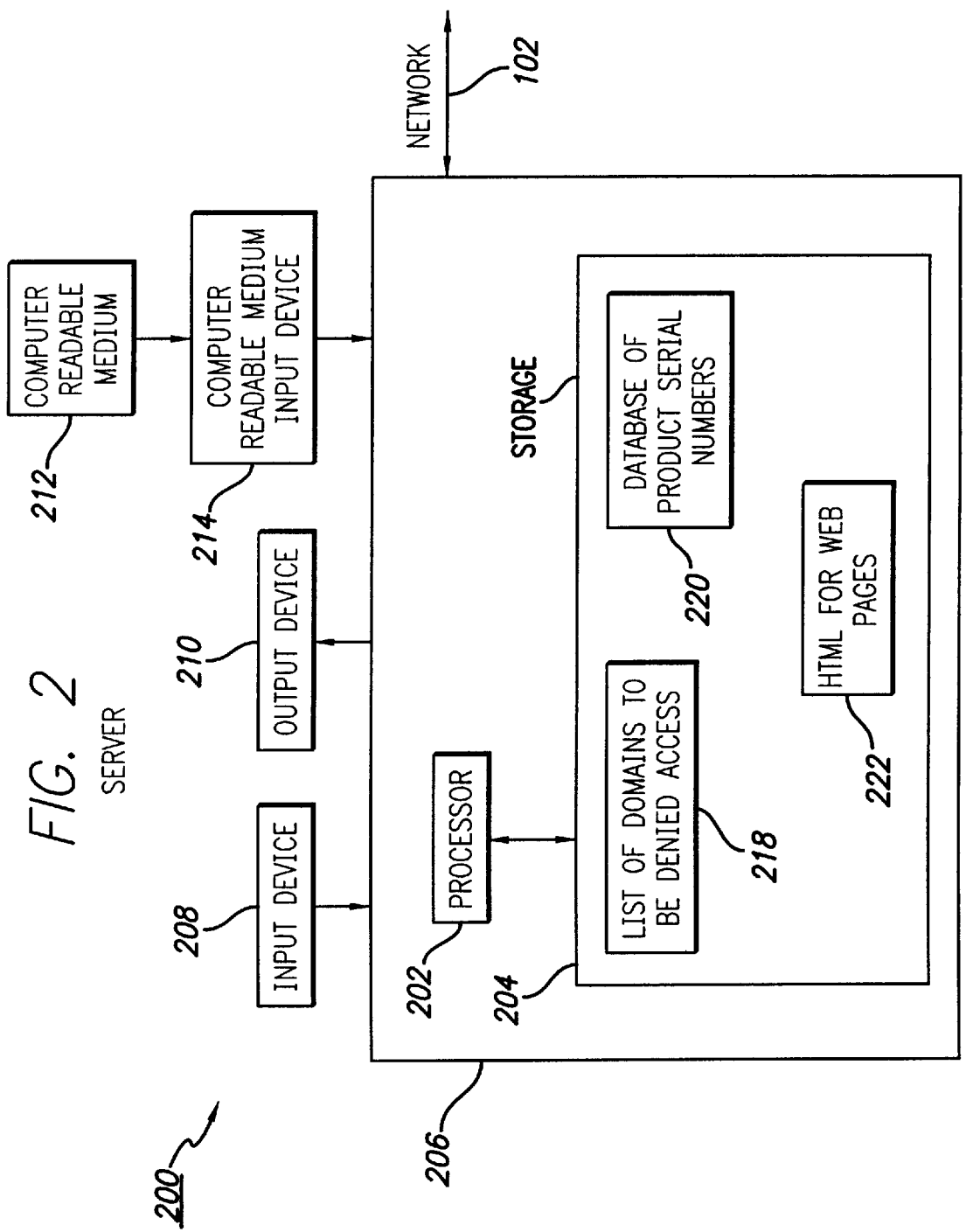
FIG. 2 is a diagram of a data processing system which performs as a server in accordance with an embodiment consistent with the present invention.

FIG. 2 shows a data processing system 200 which is programmed to perform the functions of a server such as server system 104. Data processing system 200 includes a processor 202 and storage 204, which includes a list of domains to be denied access 218, a database of product serial numbers 220, and HTML for web pages 222. The list of domains to be denied access 218 includes a list of Internet URLs (Uniform Resource Locators) which point to network locations which are to be denied access to the online site. The purpose of maintaining such a list is to have control over who has access to the electronic software distribution site. For example, export controls may be implemented by performing a search on the Internet domain of the user who is attempting to access the electronic software distribution site, assuming that the Internet domain indicates the origin of the user. If the user is from a foreign country which is prohibited from purchasing software in the United States, for example, that user's Internet domain will be on the list of domains to be denied access 218. When the user's Internet domain shows up as a match on the list of domains to be denied access 218, that user then may be denied access to the site, or at least denied access to parts of the site which are export sensitive.

Data processing system 200 also includes a network connection 102, an input device 208, output device 210, computer readable medium 212, and computer readable input device 214. A person of ordinary skill in the art will understand that data processing system 200 may also contain additional information, such as input/output lines; input devices, such as a keyboard, a mouse, and a voice input device; and display devices, such as a display terminal. Input device 208 may be a floppy disk drive, CD ROM reader, or DVD reader, that reads computer instructions stored on a computer readable medium, such as a floppy disk, a CD ROM, or a DVD drive. Data processing system 200 also may include application programs, operating systems, data, etc., which are not shown in the figure for the sake of clarity. It also will be understood that data processing system 200 may also include numerous elements not shown, such as disk drives, keyboards, display devices, network connections, additional memory, additional CPUs, LANs, input/output lines, etc.

It will be understood that the steps of methods and flow charts discussed preferably are performed by an appropriate processor 202 executing instructions stored in storage 204. It will also be understood that the invention is not limited to any particular implementation or programming technique and that the invention may be implemented using any appropriate techniques for implementing the functionality described herein. The invention is not limited to any particular programming language or operating system.

The instructions in storage 204 may be read from computer-readable medium 212. Execution of sequences of instructions contained in storage 204 causes processor 202 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

Figure 3:
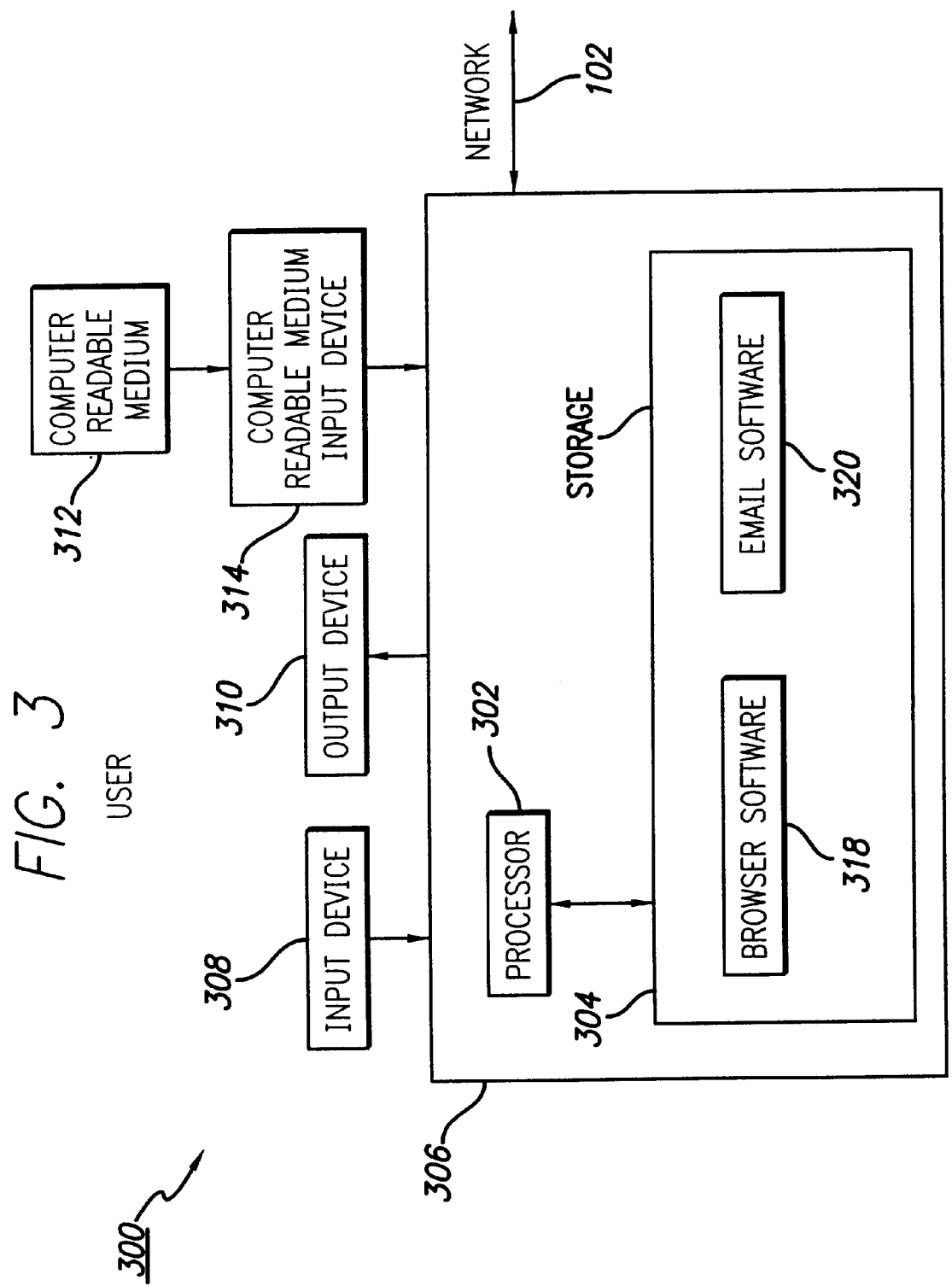
FIG. 3 is a diagram of a data processing system which performs as a user in accordance with an embodiment consistent with the present invention.

FIG. 3 shows a data processing system 300 which is programmed to perform the functions of a user, for example user systems 106, 108. Data processing system 300 includes a processor 302 and storage 304, which includes browser software 318 and email software 320. Data processing system 300 also includes a network connection 102, an input device 308, output device 310, computer readable medium 312, and computer readable input device 314. Browser software 318 is used for viewing the pages of the online sites in both private and public environments. Email software 320 is used for relaying messages electronically in connection with the electronic software distribution process 400 (described below) performed by electronic software distribution apparatus 100. The discussion above in FIG. 2 relating to the variations of the parts of data processing system 200 also applies to data processing system 300 of FIG. 3.

FIG. 4 is a flowchart 400 showing steps performed by a data processing system programmed to implement a method for electronic software distribution consistent with the present invention. Flowchart 400 begins at step 402 where information concerning readiness criteria related to the electronic distribution of a software product is received and stored in a central location in a private environment. This private environment may be a web site or one or more web pages that are accessible to a product team involved in the product release. The web pages may be implemented in HTML or any other appropriate language. After receiving the readiness criteria information, a private environment is provided in step 404 for sites that will be used for testing the electronic software distribution. The purpose of creating a private environment for the readiness criteria and for the testing is to provide security for information relating to the software release, and to prevent public access to the software product to distributed before it is ready for release.

The testing site is then installed in step 406, and the product site is tested in step 408. The content of the testing is specified by the readiness criteria and may include such activity as making sure that the HTML links to the product are correct, that any text relating to the product including descriptions of the product itself and of the pricing of the product are correct, that the payment process works correctly and securely, that export controls are execute correctly, and that the correct files relating to the software product being distributed are downloaded to the prospective buyer in response to the buyer's order and payment. The testing may be performed by members of the product team who have been given the location of the testing environment, for example a URL, any additional information that is required for testing specific parts of the software product distribution test site. For example, fake credit card numbers may be used so that product team members may "buy" software from the product site, thus simulating an actual purchase of the software product from the site.

In step 410, a check is done to determine whether the tests have passed. If the tests pass based on the UAT criteria, then a public environment is provided for the product distribution site, in step 412, and the software product is ready for public distribution. Providing a public environment is the process of allowing public access to the product site and may be done in a variety of ways known to people having ordinary skill in the art. If the tests do not pass in step 410, revealing problems in the product site, the problems are fixed and testing is resumed at step 408.

Figure 6:
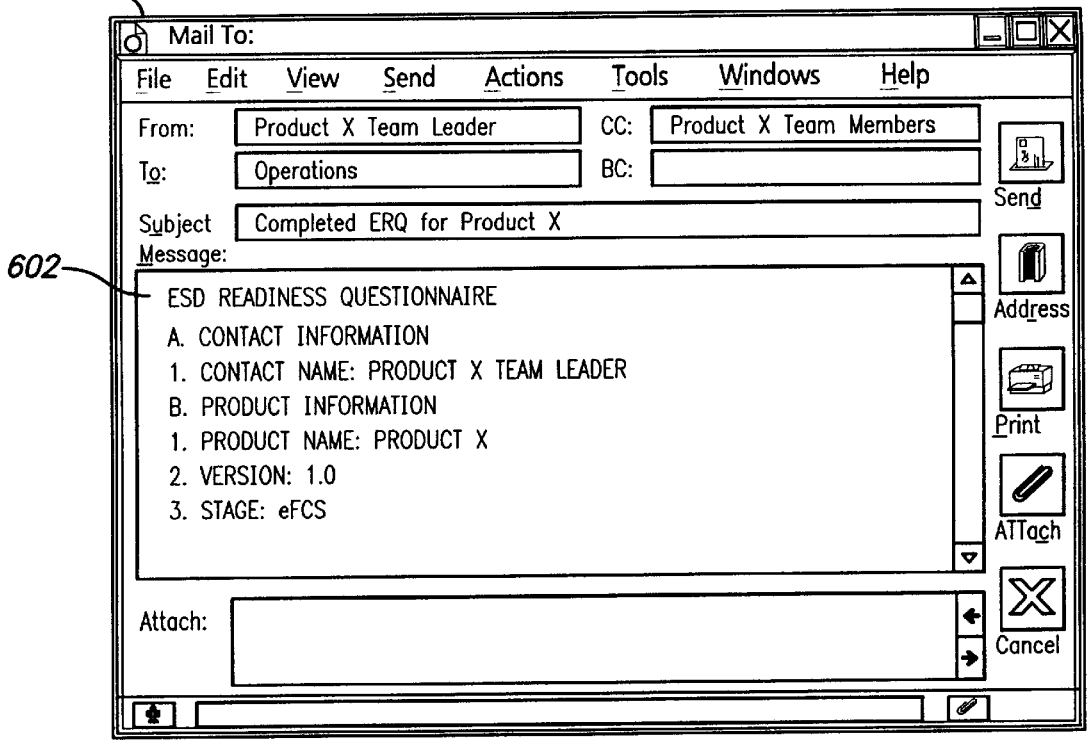
FIG. 6 is a diagram showing an exemplary submission of a completed electronic software distribution readiness questionnaire (ERQ) via software in a data processing system in accordance with an embodiment consistent with the present invention.

FIG. 5 is a flow chart 500 showing steps performed in a data processing system programmed to implement a method for electronic software distribution consistent with the present invention. Flow chart 500 begins at step 502 where the product team (PT) submits a completed electronic software distribution readiness questionnaire (ERQ) to Operations (OPS). The submission of the ERQ is done electronically, for example via e-mail, as shown in FIG. 6 in which the team leader for product X has sent the ERQ to Operations via an email message 600. ERQ information is contained in the body 602 of email message 600.

After submission of the ERQ, the product team (PT) complies with a product readiness approval (PRA) step which is spelled out in the readiness criteria information, in step 504.

Figure 7:
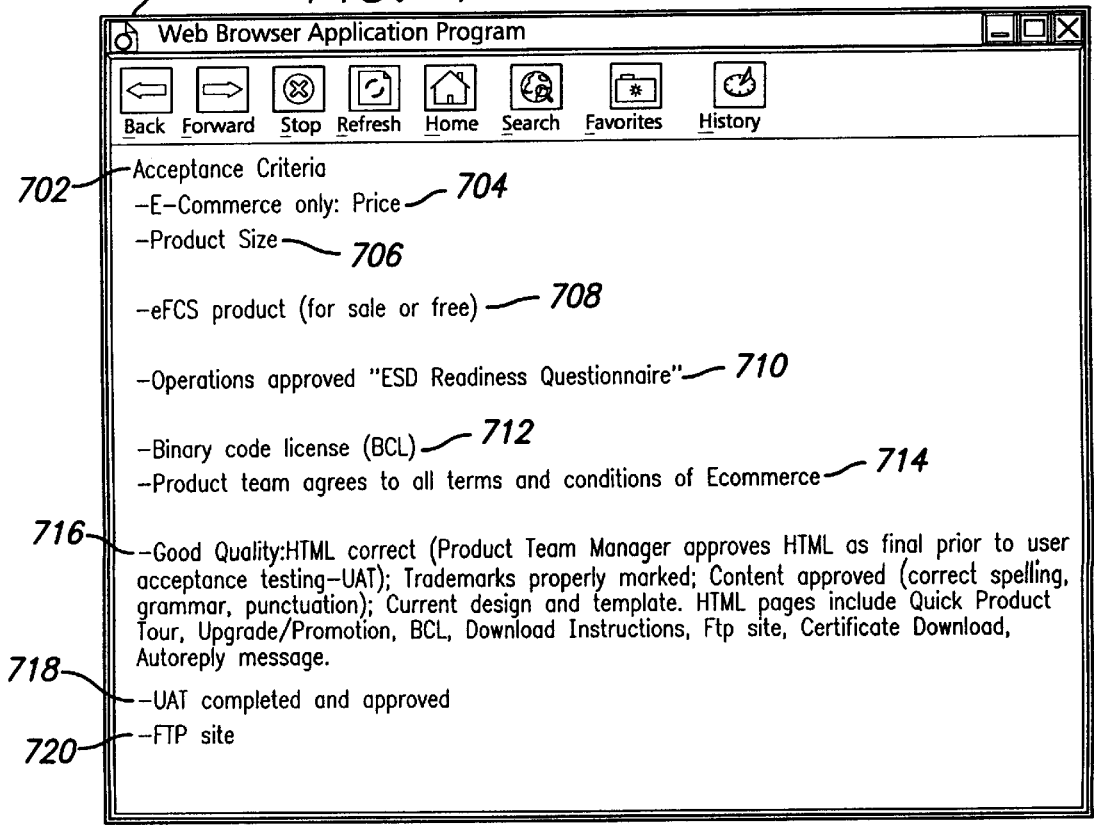
FIG. 7 is a diagram showing an exemplary posting of acceptance criteria via software in a data processing system in accordance with an embodiment consistent with the present invention.
Figure 8:
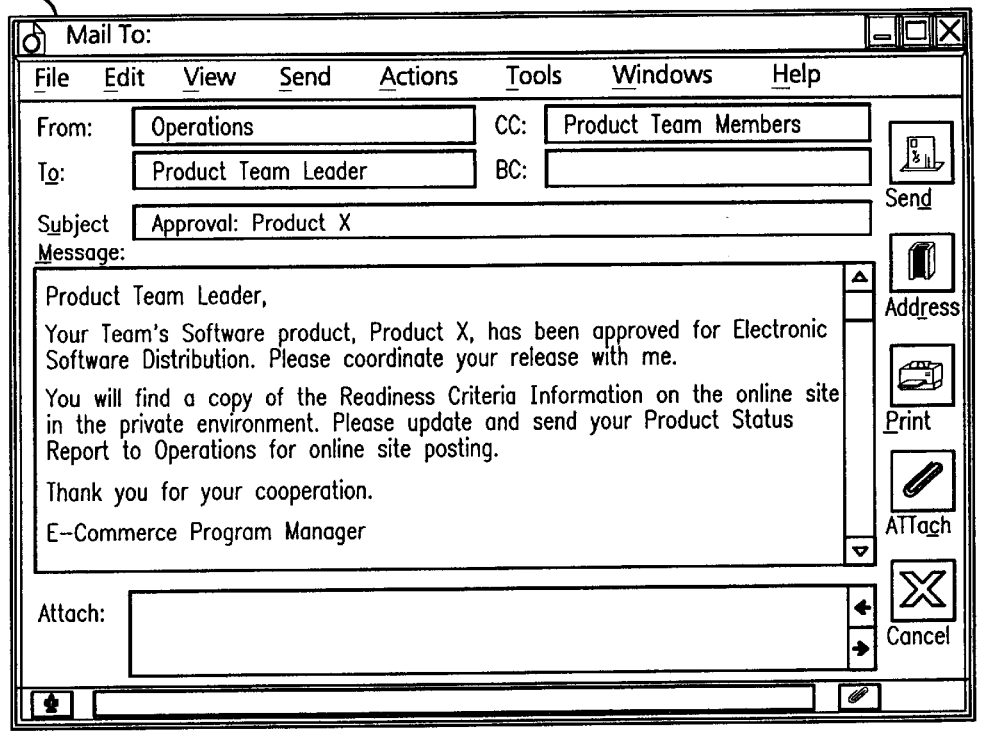
FIG. 8 is a diagram showing an exemplary approval of readiness criteria information via software in a data processing system in accordance with an embodiment consistent with the present invention.

Then in step 506, the product team completes a software classification questionnaire (SCQ) for export approval. The software classification affects how the software product will be distributed and thus, affects how the online site is set up. The product team then receives export approval, in step 508, Operations approves the ERQ and e-mails the product team, in step 510. An example of such an email is shown in FIG. 8, where email message 800 communicates approval of the acceptance criteria, and is sent from Operations to the product is team leader. In step 512, Operations post the ERQ in a central location such as the electronic software distribution (ESD) web site which includes the product roadmap and readiness questionnaire web pages. An example of an acceptance criteria page is shown in FIG. 7 which shows an Internet browser pointing to a page containing acceptance criteria 702.

Figure 9A:
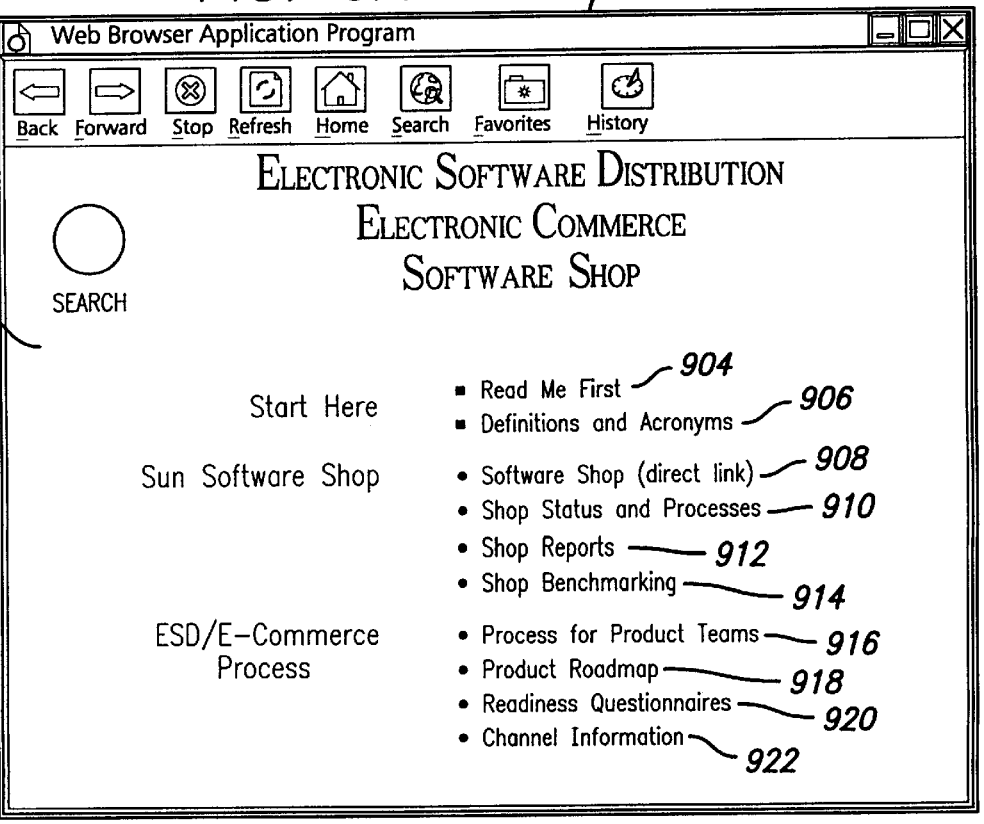
FIG. 9a is a diagram showing an example of a central location for readiness criteria information in a data processing system in accordance with an embodiment consistent with the present invention.
Figure 9B:
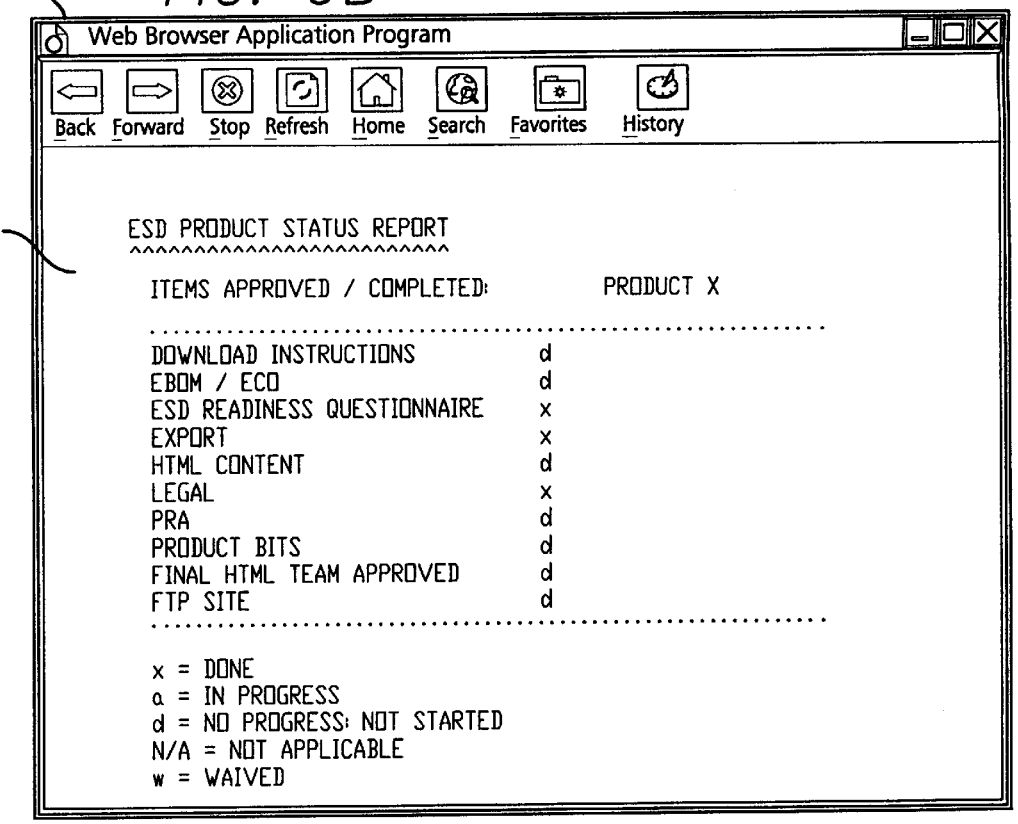
FIG. 9b is a diagram showing an exemplary posting of status of the approval of readiness criteria via software in a data processing system in accordance with an embodiment consistent with the present invention.

Such a central location is shown, for example, on the pages of an online site corresponding to the ESD web site in FIG. 9a and FIG. 9b. FIG. 9a shows an Internet browser page 900 on which a page 902 containing hypertext links 904–922 is shown. Links 904–922 may be selected by a user who wants more information. By selecting a link, the user may access another page of the online site. For example, by selecting link 918 labeled "Product Roadmap", the user may access a product status report 924 as shown appearing on Internet browser 900 in FIG. 9b.

Examples of acceptance criteria include a price 704, product size 706, a "for sale" indicator 708 showing whether the product is to be for sale or free, an approval indicator 710 showing whether Operations has approved the ERQ, a BCL indicator 712 showing whether a binary code license (BCL) is completed, an agreement indicator 714 showing whether the product team agrees to all the terms and conditions of E-commerce, a quality indicator 716, a user acceptance test (UAT) completed and approved indicator 718, and a file transfer protocol (FTP) site availability indicator 720. In an embodiment consistent with the present invention, quality indicator 716 may include correct HTML pages (approved as final prior to UAT), properly marked trademarks, approved content (including correct spelling, grammar, and punctuation), and a current design and template. The HTML pages may include features such as a quick product tour, upgrade/promotion, BCL, download instructions, an FTP site, certificate download, and autoreply message.

The HTML pages referred to above may be accessed via Internet browser software such as Netscape Navigator or Microsoft Explorer. Steps 502 through steps 512 generally correspond to step 402 of flow chart 400, in which information is received concerning readiness criteria, and is stored in a central location in a private environment.

Figure 10:
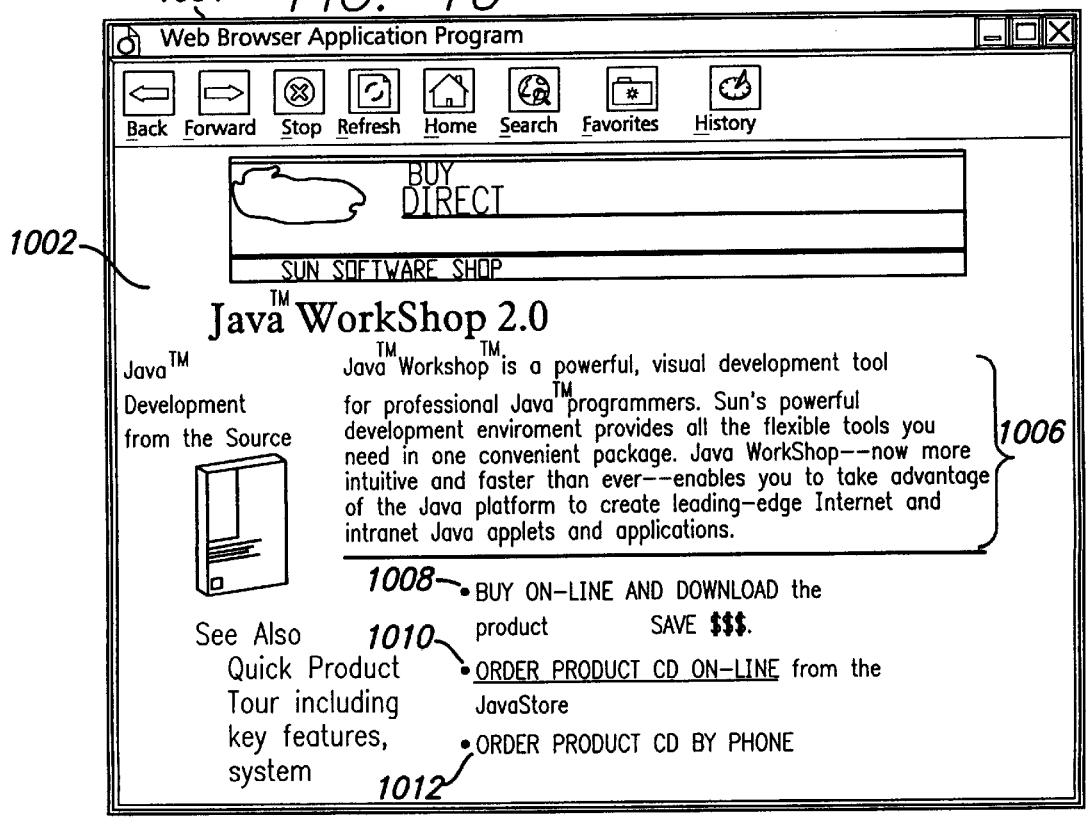
FIG. 10 is a diagram showing an exemplary posting of a private test environment via software in a data processing system in accordance with an embodiment consistent with the present invention.

In order to provide a private environment for the product site, Operations sends a request for enhancement (RFE) to add a new product, in step 514. A user acceptance test (UAT) environment is then created in step 516. After steps 514 and 516, which generally correspond to step 404 of flow chart 400, the product team provides preliminary HTML pages to Operations, in step 518. An example of such a preliminary page is shown in FIG. 10 in which online site page 1002 is loaded on the UAT and accessed via Internet browser 1004. Page 1002 is an online site containing a description 1006 of the product to be sold (Java™ Workshop™ 2.0), and various links 1008–1012 to functions in the electronic distribution process. For example, link 1008 allows a user to access a page for purchasing and downloading a product directly from the online site. Typically, this may include a form in which a user provides billing information such as a billing address and a credit card number along with its expiration date. Such transaction may be performed on a secure server to protect the user's privacy and billing information. Link 1010 allows a user to order a product CD on-line and is similar to link 1008 in that user provides billing information, however, since the CD is a physical item which must be sent via a shipping service such as mail (e.g., U.S. Postal Service), courier, or express (e.g., FedEx), the user must in addition provide a shipping address. Link 1012 gives the user a phone number to call for placing an order. A user who selects link 1012 need not provide any input to the online site other than selecting the link.

Steps 526, 528, and 530 are performed in parallel with steps 520 and 522. In step 526, a legal review of the text of the preliminary HTML pages is performed along with a review of the binary code license (BCL) agreement. Data bits associated with the product are then provided by release engineering in step 528. In step 530, release engineering provides the data bits to IR for inclusion in the online site. These bits are used in step 524 for the database entry work and for moving the HTML pages to the user acceptance test environment (UAT). In step 530, a software release manager (SRM) provides via email an electronic bill of materials (EBOM) 1104, shown as an attachment to an e-mail message 1102, as shown in FIG. 11. Then in step 522, Operations coordinates HTML page build for download and the addition of EBOM-related meta tags to HTML page files and copies them to the test environment. The meta tags are used in step 524 where the database entry work and the relocation of the pages to a user acceptance test (UAT) environment is performed electronically. When step 524 is complete, an engineering change order (ECO) may be approved, in step 532. ECO approval is performed electronically via email 1202 as shown in FIG. 12. Steps 518 through 532 generally correspond to step 406 of flow chart 400.

Figure 13:
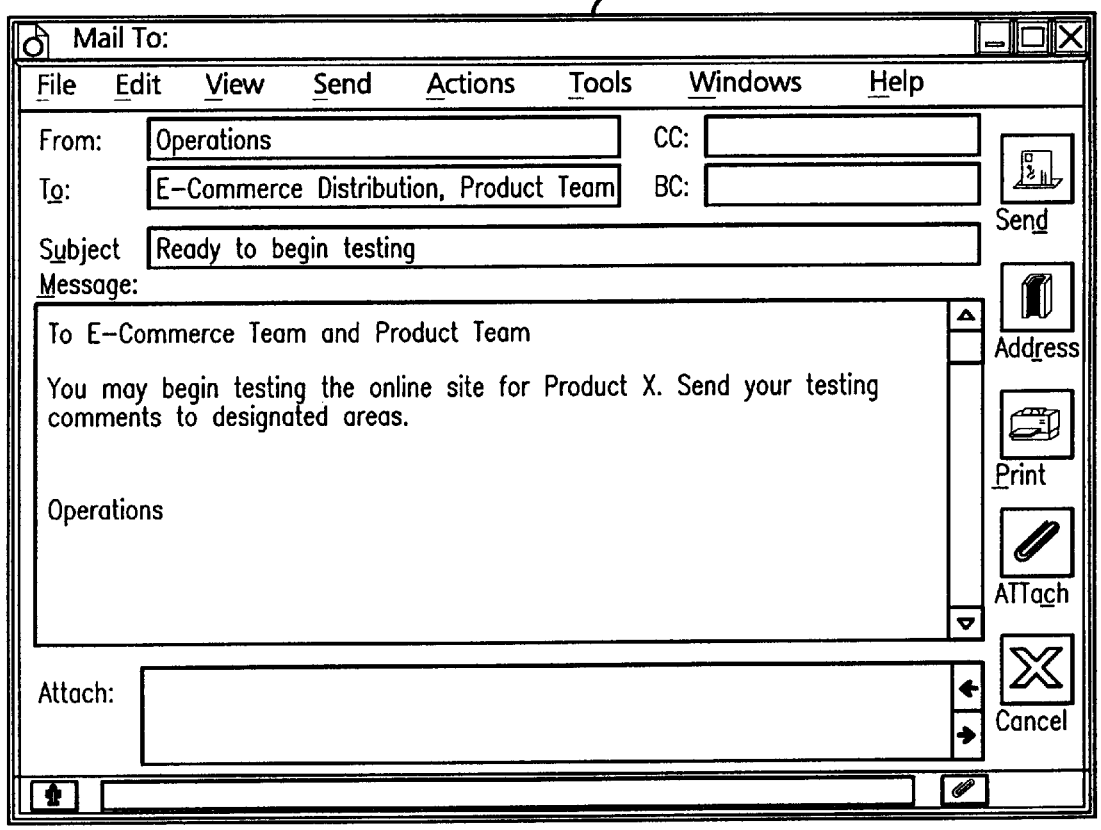
FIG. 13 is a diagram showing an exemplary distribution of a notification for a product team to begin testing via software in a data processing system in accordance with an embodiment consistent with the present invention.

After the ECO is approved in step 532, Operations notifies the electronic software distribution team (EST) via email, as shown by email message 1302 in FIG. 13. The product team then begins to test the text and links of the page in step 534. These tests may include items from a UAT checklist 1502 such as that shown via Internet browser 1504 of FIG. 15. In step 536, testing fixes are confirmed and Operations schedules retests if necessary. Steps 534 and 536 generally relate to step 408 of flow chart 400.

In step 538, Operations coordinates publishing of a new uniform resource locator (URL) on a top-level web product page, as shown for example in FIG. 14. This page will be in a public environment. In step 540 the download area and URL is made available for public access, in other words a public environment has been provided for this site so that prospective purchasers may purchase software products via an Internet browser 1402. Links to the software product ordering pages are included for software products such as: Java™ Tools Bundle, which is accessible via link 1404; Java™ Workshop™, which is accessible via link 1406; Java™ Studio, which is accessible 1408; and Solstice™ Network Client™, which is accessible via link 1410. Steps 538 and 540 generally correspond to step 412 of flow chart 400.

Optionally, after the download area is made public reseller packages may be pushed to a reseller distribution area, in step 542 and in the case of a web host, the reseller package down load area may be set up with a password, in step 544. WebHost is where resellers host product binaries on their systems for customers to download.

Other embodiments consistent with the present invention will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of implementing electronic software distribution of a software product comprising:

receiving readiness criteria that defines a process for distributing a software product in a data processing system;

providing a private environment on an online site that restricts access to the software product within the data processing system;

testing the electronic software distribution of the software product as defined by the readiness criteria in the private environment on the online site, where the testing determines if the electronic software distribution meets predefined standards; and providing a public environment with access to the software product available from the online site when the testing of the electronic software distribution results in a distribution of the software product pursuant to the readiness criteria which meets the predefined standards.

2. The method of claim 1 further comprising:

storing the readiness criteria in a central location of the private environment.

3. The method of claim 1, wherein the private environment is a web site that is accessible to a product team involved in releasing the software product.

4. The method of claim 3, wherein the testing is performed by the product team that has been provided an address of the private environment.

5. The method of claim 4, wherein the address is a Uniform Resource Locator.

6. The method of claim 3, further comprising:

receiving a completed electronic software distribution readiness questionnaire (ERQ) from the product team.

7. The method of claim 6, further comprising:

complying with a product readiness approval that is defined by the readiness criteria.

8. The method of claim 7, further comprising:

receiving a completed software classification questionnaire (SCQ) from the product team that defines the electronic software distribution of the online site.

9. The method of claim 8, further comprising:

posting the ERQ on a central location within the online site if the ERQ and SCQ are approved.

10. The method of claim 1, wherein the testing includes:

testing the readiness criteria to ensure that HTML links to the software product are correct.

11. The method of claim 1, wherein the testing includes:

testing the readiness criteria to ensure that pricing of the product is correct.

12. The method of claim 1, wherein the testing includes:

testing the readiness criteria to ensure that a payment process performs correctly and securely.

13. The method of claim 1, wherein the testing includes:

testing the readiness criteria to ensure that export controls execute correctly.

14. The method of claim 1, wherein the testing includes:

testing the readiness criteria to ensure that files relating to the software product will be distributed in response to a prospective order and payment from a buyer.

15. The method of claim 1, wherein the predefined standards are UAT criteria.

16. An apparatus that performs a method of implementing electronic software distribution of a software product comprising:

circuitry configured to receive readiness criteria that defines a process for distributing a software product in a data processing system;

circuitry configured to provide a private environment on an online site that restricts access to the software product within the data processing system;

circuitry configured to test the electronic software distribution of the software product as defined by the readiness criteria in the private environment on the online site, when the testing determines if the electronic software distribution meets predefined standards; and circuitry configured to provide a public environment with access to the software product available from the online site when the testing of the electronic software distribution results in a distribution of the software product pursuant to the readiness criteria which meets the predefined standards.

17. A computer program product comprising:

a computer usable medium having computer readable code embodiment therein for performing a method of implementing electronic software distribution of a software product including:

computer readable program code devices configured to effect receiving readiness criteria that defines a process for distributing a software product in a data processing system;

computer readable program code devices configured to effect providing a private environment on an online site that restricts access to the software product within the data processing system;

computer readable program code devices configured to effect testing the electronic software distribution of the software product as defined by the readiness criteria in the private environment on the online site when the testing determines if the electronic software meets the predefined standards; and computer readable program code devices configured to effect providing a public environment with access to the software product available from the online site when the testing of the electronic software distribution results in a distribution of the software product pursuant to the readiness criteria which meets the predefined standard.

* * * * *